United States Patent [19]

Aoki et al.

[11] Patent Number: 5,080,716
[45] Date of Patent: Jan. 14, 1992

[54] INK HAVING USE IN INK-JET RECORDING

[75] Inventors: Makoto Aoki, Yokohama; Kumiko Mafune, Kawasaki; Shinichi Tochihara, Hadano; Osamu Nishiwaki, Atsugi; Kenji Aono, Kawasaki; Akira Nagashima, Tokyo, all of Japan

[73] Assignee: Canon Kabushiki Kaisha, Tokyo, Japan

[21] Appl. No.: 651,425

[22] Filed: Feb. 6, 1991

[30] Foreign Application Priority Data

Feb. 9, 1990 [JP] Japan .................................. 2-30660
Jan. 23, 1991 [JP] Japan .................................. 3-6397

[51] Int. Cl.$^5$ .............................................. C09D 11/02
[52] U.S. Cl. .......................................... 106/20; 106/22
[58] Field of Search ................................... 106/20, 22

[56] References Cited

U.S. PATENT DOCUMENTS 4,878,946 11/1989 Tabayashi et al. ................... 106/20
4,957,117 12/1990 Tabayashi et al. ................... 106/22
5,006,170 4/1991 Schwarz et al. ..................... 106/22

FOREIGN PATENT DOCUMENTS 104933 8/1979 Japan .
143305 11/1979 Japan .
59-757 4/1984 Japan .

Primary Examiner—William R. Dixon, Jr.
Assistant Examiner—Helene Klemanski
Attorney, Agent, or Firm—Fitzpatrick, Cella, Harper & Scinto

[57] ABSTRACT

An ink comprises a recording agent and a liquid medium capable of dissolving or dispersing the recording agent, wherein said ink contains a compound represented by the following Formula (I):

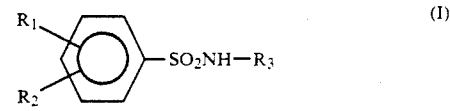

wherein $R_1$ and $R_2$ each represent a group selected from a hydrogen atom, an alkyl group, a hydroxyl group and a carboxyl group; and $R_3$ represents a monohydric hydroxyalkyl group. The ink is suitably used for ink-jet recording.

2 Claims, 3 Drawing Sheets

INK HAVING USE IN INK-JET RECORDING

BACKGROUND OF THE INVENTION

1. Field of the Invention

The present invention relates to an ink, an ink-jet recording process, and and instrument making use of the ink. More particularly it relates to an ink, an ink-jet recording process, a recording unit, an ink-jet recording apparatus and an ink cartridge that are used in plain paper-adapted ink-jet recording, capable of making a record on non-coated paper such as wood free paper, medium wood free paper or bond paper, i.e., what is called plain paper.

2. Related Background Art

Inks used in the plain paper-adapted ink-jet recording are required to have mainly the following four performances:

(1) Fixing performance: Evaluated on the basis of the time by which the ink prints formed on a recording paper is apparently dried and the paper is no longer stained when rubbed with fingers. The shorter the time is, the more preferable.

(2) OD (optical density): Reflection density of an image recorded by printing on a recording paper. In general, a higher OD is obtained when a dye does not penetrate into the inner part of the paper and remains on the surface in a greater proportion. Such a higher OD is preferable.

(3) Print quality level: print quality level is deemed better when a dot recorded by printing is closer to a perfect circle. Conventional inks give a dot with notches because of the influence of the fiber of paper, when printed on plain paper.

(4) Anti-stick properties. Properties of preventing ink from being evaporated to solidification in an ink-jet recording head. The less solidification that is caused, the more preferable.

It is difficult to produce an ink capable of satisfying all the performances, since most of these characteristics conflict with each other. For example, the fixing performance and the anti-stick properties. When a stress is laid on the fixing performance, it is the condition of good ink that the ink is readily evaporated. On the other hand, when a stress is laid on the anti-stick properties, the situation is quite the reverse, where it is the condition of good ink that the ink is not readily evaporated, bringing about a great inconsistency.

The fixing performance and the OD also have a similar inconsistency. In order to improve the fixing performance, the penetrability of ink into recording paper may be improved. Such an improvement, however, results in a sinking of ink to the depth direction of the paper. Penetration of ink into the inner part of the paper results in a lowering of the OD because of the light scattering caused by the fiber at the paper surface.

The fixing performance and the print quality level also bring about a similar inconsistency. Namely, an improvement in the penetrability of ink into recording paper results in an improvement in the fixing performance. Since, however, paper has a non-uniform structure (unevenness or fibrous structure), there is a difference in the penetration depth (the distance of penetration.) Use of an ink that readily penetrates increases the difference in this penetration depth, resulting in the absence of formation of a round dot but formation of a dot, with notches.

Thus, it has been hitherto very difficult to produce an ink capable of satisfying all of the four performances of ink, i.e., the fixing performance, OD, print quality level and anti-stick properties, with respect to the ink used in the plain paper-adapted ink-jet recording. Under such circumstances, there have been some attempts to improve inks.

Japanese Patent Application Laid-open No. 54-143305 discloses an example in which a polyhydric hydroxyalkyl derivative of an aromatic sulfonamide is used as a substance for improving the anti-stick properties of ink. In this example, however, the ink can achieve superior anti-stick properties, but has a low OD and a poor print quality level and fixing performance. In addition, this ink can not achieve a good initial ejection performance when ejected using a head for ink-jet recording. The initial ejection performance refers to the state of ejection of the ink that is ejected as the first shot after water has been evaporated from the nozzle tips during the stop of printing. The reason why the ink disclosed in the Japanese Patent Application Laid-open No. 54-143305 is not superior in this initial ejection performance is unclear, but is presumed to be that the hydroxyl groups of the polyhydric hydroxyalkyl of an aromatic sulfonamide form hydrogen bonds and hence the viscosity of evaporated ink is extremely increased. As an example of aromatic sulfonamides having a plurality of hydroxyl groups, an ink disclosed in Japanese Patent Application Laid-open No. 54-104933 also causes a poor initial ejection performance for the same reason.

Thus, none of the conventional inks have been able to completely satisfy the performances required as inks for ink-jet recording.

SUMMARY OF THE INVENTION

Accordingly, the objects of the present invention are to provide an ink having superior fixing performance, OD, print quality level and anti-stick properties that are required as inks used in the above plain paper-adapted ink-jet recording, and also having a superior initial ejection performance, to provide an ink-jet recording process making use of it to enable high-speed recording, and to provide an instrument making use of such an ink.

To achieve the above objects, the present invention provides an ink comprising a recording agent, a liquid medium capable of dissolving or dispersing the recording agent, and a compound represented by the following Formula (I):

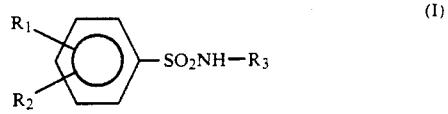

wherein $R_1$ and $R_2$ each represent a group selected from a hydrogen atom, an alkyl group, a hydroxyl group and a carboxyl group; and $R_3$ represents a monohydric hydroxyalkyl group.

The present invention also provides an ink-jet recording process comprising ejecting ink droplets from an orifice in accordance with a recording signal to make a record on a recording medium, wherein the ink as described above is used.

The present invention still also provides a recording unit comprising an ink holder that has held an ink and a head from which the ink is ejected in the form of ink droplets, wherein the ink described above is used as ink.

The present invention further provides an ink cartridge comprising an ink holder that has held an ink, wherein the ink as described above is used as ink.

The present invention still further provides an ink-jet recording apparatus comprising a recording unit comprising an ink holder that has held an ink and a head from which the ink is ejected in the form of ink droplets, wherein the ink as described above is used as ink.

The present invention still further provides an ink-jet recording apparatus comprising a recording head from which ink droplets are ejected, an ink cartridge having an ink holder that has held an ink and an ink feeder that feeds ink from said ink cartridge to said recording head, wherein the ink as described above is used as ink.

DESCRIPTION OF THE PREFERRED EMBODIMENTS

Figure 1A:
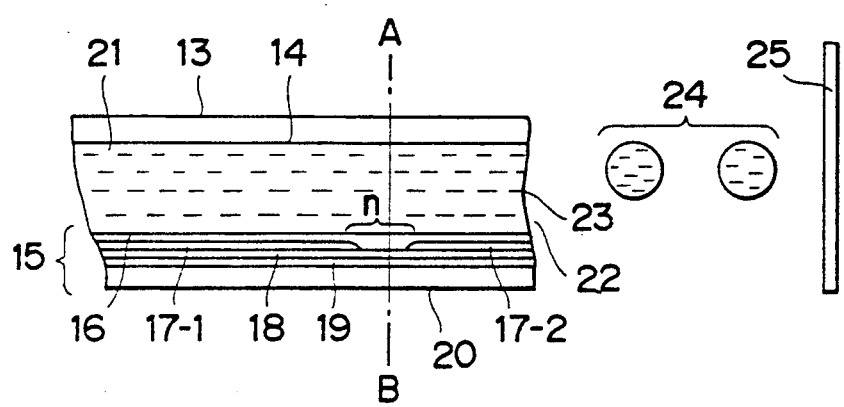
FIGS. 1A and 1B illustrate a vertical cross section and a transverse cross section, respectively, of a head of an ink-jet recording apparatus.

The ink composition as described above can maintain a high reliability without causing any clogging, even when its constituents other than water, as exemplified by organic solvents, are used in extremely small quantities. Since the ink has a large water content, the ink in records can be readily evaporated and can advantageously act on plain-paper recording performances such as OD, fixing performance and print quality level.

The present invention will be described below in detail.

The ink of the present invention is a water-based ink, and hence its main solvent medium is water.

A coloring material (i.e., a recording agent) includes dyes and pigments, which may be properly used according to occasions, and water-soluble dyes are commonly used. All sorts of water-soluble dyes such as direct dyes, acid dyes and basic dyes can be used as the dyes. The dyes may be used in a concentration appropriately selected usually in the range of from 0.1 wt. % to 10 wt. %.

Prints can be obtained using an ink-jet recording head even when the ink is formed of a mere mixture of water and a dye, but good anti-stick properties and initial ejection performance cannot be obtained unless any additional measure is taken. Now, in the present invention, the compound represented by Formula (I) is used as a substance having an effect as an improver for anti-stick properties and also an improver for initial ejection performance,

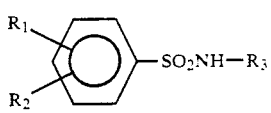

(I)

wherein $R_1$ and $R_2$ each represent a group selected from a hydrogen atom, an alkyl group, a hydroxyl group and a carboxyl group; and $R_3$ represents a monohydric hydroxyalkyl group.

Examples of this compound are shown below. Examples thereof are by no means limited to these:

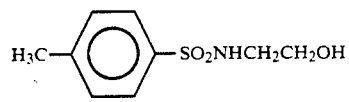

[1]

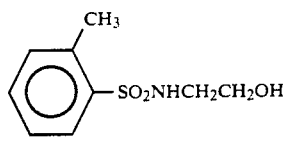

[2]

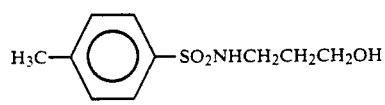

[3]

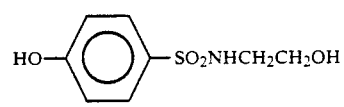

[4]

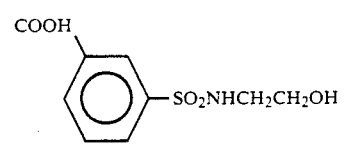

[5]

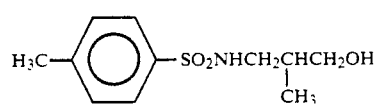

[6]

Of the above compounds, the compounds [1] and [2] are particularly preferred since they have such a great effect as an improver for anti-stick properties that the ink may hardly stick.

The compound exemplified above may be used usually in an amount ranging from 0.1 wt. % to 30 wt. %, preferably from 0.2 wt. % to 15 wt. %, and more preferably from 0.5 wt. % to 10 wt. %, based on the total weight of the ink. This is because an amount of less than 0.1 wt. % can bring about little effect as an anti-stick agent, and an amount more than 30 wt. % may bring about disadvantages such that the viscosity of the ink increases.

The reason why such compounds have the effect as an improver for anti-stick properties and an improver for initial ejection performance is not clear, but it is presumed to be that these compounds have an effect in greatly improving the solubility of dyes. It can also be presumed as follows: The formation of hydrogen bonds does not so much affect the recording performance because of the monohydric hydroxyalkyl group bonded, as a substituent, to the aromatic sulfonamide, so that the increase in viscosity of evaporated ink becomes small and hence a superior initial ejection performance can be achieved.

The water may be used usually in an amount ranging from 40 wt. % to 95 wt. % and preferably from 70 wt. % to 95 wt. %. An amount less than 40 wt. % may bring about the problems that the viscosity increases, the ink tends to cause feathering and the fixing performance becomes poor. An amount more than 95 wt. % results in an excessively large quantity of evaporating components which inhibits the anti-stick properties.

Besides the foregoing, water-soluble organic solvents commonly used in ink-jet recording inks may also be used. The water-soluble organic solvents should be those having a low vapor pressure in themselves, capable of decreasing the rate of evaporation of water content in ink and also having the properties of dissolving dyes or pigments, thus having the effect as an improver for anti-stick properties.

Preferred water-soluble organic solvents include, for example, amides such as dimethylformamide and dimethylacetamide; ketone or keto-alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazolidinone; polyalkylene glycols such as polyethylene glycol and polypropylene glycol; alkylene glycols comprising an alkylene group having 2 to 6 carbon atoms, such as ethylene glycol, propylene glycol, butylene glycol, triethylene glycol, 1,2,6-hexanetriol, thiodiglycol, hexylene glycol and diethylene glycol; glycerol; and lower alkyl ethers of polyhydric alcohols, such as ethylene glycol methyl ether, diethylene glycol methyl (or ethyl) ether and triethylene glycol monomethyl (or ethyl) ether.

The above water-soluble organic solvent used in the ink of the present invention may be contained in an amount ranging from 0 wt. % to 50 wt. %, preferably from 0 wt. % to 20 wt. %, and more preferably from 0 wt. % to 10 wt. %.

Besides this, an organic solvent capable of improving fixing performance may be used in some instances. An ink making use of such an organic solvent has very superior drying characteristics when prints are made on recording paper. The organic solvent that can promise such an effect may preferably include alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; cyclic alkyl alcohols such as cyclohexanol; amides such as dimethylformamide and dimethylacetamide; ketone or keto-alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazolidinone; glycerol; and surface active agents such as fatty acid alkylolamides, N-acyl-sarcosinate and an acetylene alcohol-ethylene oxide adduct.

Any of these substances capable of improving fixing performance may preferably be used in an amount appropriately selected in the range of from 0 wt. % to 50 wt. % based on the ink.

The ink with the constitution as described above makes it possible to provide an ink having superior anti-stick properties and fixing performance even with use of a smaller amount of organic solvent than that in conventional inks. Since the organic solvent is in a smaller amount (i.e., the water is in a larger amount), the evaporation loss of ink can be made greater and hence the fixing performance can be improved.

In addition, since the ink does not penetrate into the paper and is dried by evaporation, the print quality level can be improved, and also since the dye remains on the surface of the paper, the OD can be made higher.

Thus, it becomes possible to provide an ink having good performances in all the fixing performance, OD, print quality level, anti-stick properties and initial ejection performance that are required in the ink-jet recording.

The ink of the present invention can be preferably used particularly in the ink-jet recording in which recording is carried out by ejecting ink droplets by the action of heat energy. Needless to say, however, it can also be used for usual writing implements.

The method and apparatus suited to carry out recording by the use of the ink of the present invention may include a method and apparatus in which a heat energy corresponding with a recording signal is imparted to the ink held in the interior of a recording head so that ink droplets are generated by the action of the heat energy.

Figure 1B:
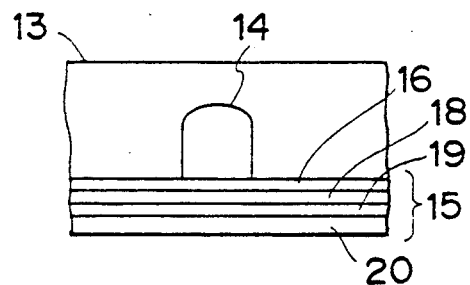
Figure 2:
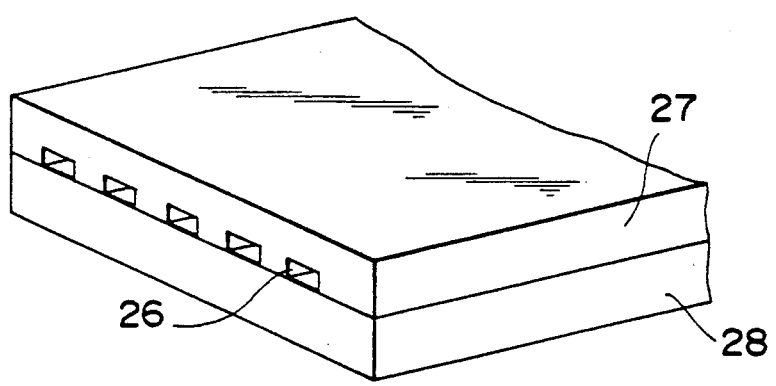
FIG. 2 is a perspective illustration of the appearance of a head comprised of a multiple set of the head as shown in FIGS. 1A and 1B.

FIGS. 1A, 1B and 2 show an example of the construction of the head, which is a main component of the apparatus.

A head 13 is formed by bonding a glass, ceramic or plastic plate or the like having a channel 14 through which ink is passed, to a heating head 15 used in thermal recording (the drawing shows a head, to which, however, is not limited). The heating head 15 is comprised of a protective film 16 formed of silicon oxide or the like, a heating resistor layer 18 formed of aluminum electrodes 17-1 and 17-2, nichrome and so forth, a heat accumulating layer 19, and a substrate 20 of alumina, etc. with good heat dissipation properties.

The ink 21 reaches an ejection orifice (a minute opening) 22 and a meniscus 23 is formed there by a pressure P.

Now, upon application of electric signals to the electrodes 17-1 and 17-2, heat is abruptly generated at the region denoted by n in the thermal head 15, so that bubbles are generated in the ink 21 coming into contact with this region. The pressure thus produced thrusts out the meniscus 23 and the ink 21 is ejected from the orifice 22 in the form of recording minute drops 24 to fly against a recording medium 25. FIG. 2 illustrates the appearance of a multi-head comprising the head as shown in FIG. 1A arranged in a large number. The multi-head is prepared by closely adhering a glass plate 27 having a multi-channel 26, to a heating head 28 similar to the head as illustrated in FIG. 1A.

FIG. 1A is a cross-sectional view of the head 13 along its ink flow path, and FIG. 1B is a cross-sectional view along the line A-B.

Figure 3:
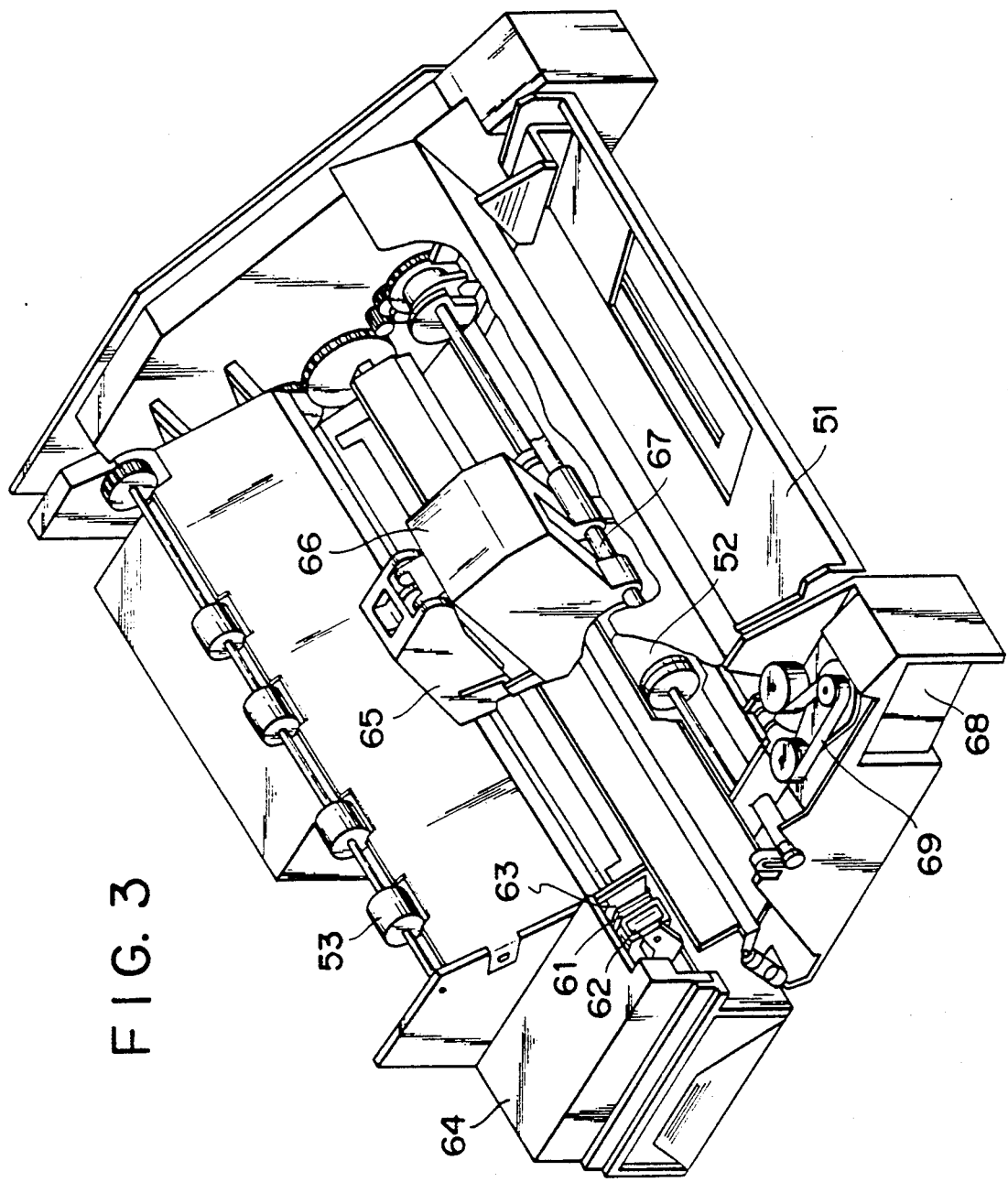
FIG. 3 is a perspective illustration of an example of ink-jet recording apparatus.

FIG. 3 shows an example of an ink-jet recording apparatus in which such a head has been incorporated.

In FIG. 3, the numeral 61 denotes a blade serving as a wiping member, one end of which is a stationary end retained by a blade-retaining member to have the form of a cantilever. The blade 61 is provided at the position adjacent to the region in which a recording head makes a record. In the present example, the blade is retained in such a form that it projects to the course through which the recording head is moved. The numeral 62 denotes a cap, which is provided at the home position adjacent to the blade 61, and is so constituted that it moves in the direction perpendicular to the direction in which the recording head is moved and comes into contact with the face of ejection openings to carry out capping. The numeral 63 denotes an absorber provided adjoiningly to the blade 61, and, similar to the blade 61, is retained in such a form that it projects to the course through which the recording head is moved. The above blade 61, cap 62 and absorber 63 constitute an ejection restoration assembly 64, where the blade 61 and the absorber 63 remove water, dust or the like from the ink ejection opening face.

The numeral 65 denotes the recording head having an ejection energy generating means and ejects ink to the recording medium set opposingly to the ejection opening face provided with ejection openings, to carry out recording. The numeral 66 denotes a carriage on which the recording head 65 is mounted so that the recording head 65 can be moved. The carriage 66 is slidably associated with a guide shaft 67. Part of the carriage 66 is connected (not shown) with a belt 69 drived by a motor 68. Thus, the carriage 66 can be moved along the guide shaft 67 and hence the recording head 65 can be moved from a recording region to a region adjacent thereto.

The numeral 51 denotes a paper feeding part from which recording mediums are inserted, and 52, a paper feed roller driven by a motor (not shown). With such construction, the recording medium is fed to the position opposing to the ejection opening face of the recording head, and, with progress of recording, outputted from a paper output section provided with a paper output roller 53.

In the above construction, the cap 62 of the head restoration assembly 64 is receded from the moving course of the recording head 65 when the recording head 65 is returned to its home position, e.g., after completion of recording, and the blade 61 stands projected to the moving course. As a result, the ejection opening face of the recording head 65 is wiped. When the cap 62 comes into contact with the ejection opening face of the recording head 65 to carry out capping, the cap 62 is moved in such a way that it projects to the moving course of the recording head.

When the recording head 65 is moved from its home position to the position at which recording is started, the cap 62 and the blade 61 are at the same position as the position where the ejection opening face is wiped. As a result, the ejection opening face of the recording head 65 is wiped also at the time of this movement.

The above movement of the recording head to its home position is made not only at the time of the completion of recording or restoration of ejection, but also when the recording head is moved between recording regions for the purpose of recording, during which it is moved to the home position adjacent to each recording region at given intervals, where the ejection opening face is wiped in accordance with this movement.

Figure 4:
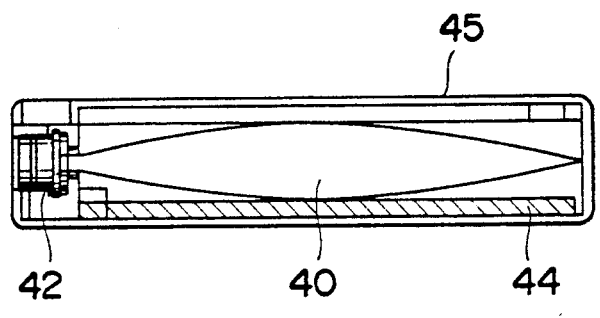
FIG. 4 is a cross-sectional illustration of an ink cartridge

FIG. 4 shows an example of an ink cartridge that has held the ink being fed to the head through an ink-feeding member as exemplified by a tube. Herein the numeral 40 denotes an ink holder that has held the feeding ink, as exemplified by an ink bag. The top thereof is provided with a stopper 42 made of rubber. A needle (not shown) may be inserted to this stopper 42 so that the ink in the ink bag 40 can be fed to the head. The numeral 44 denotes an absorber that receives a waste ink.

It is preferred in the present invention that the ink holder is formed of a polyolefin, in particular, polyethylene, at its surface with which the ink comes into contact.

Figure 5:
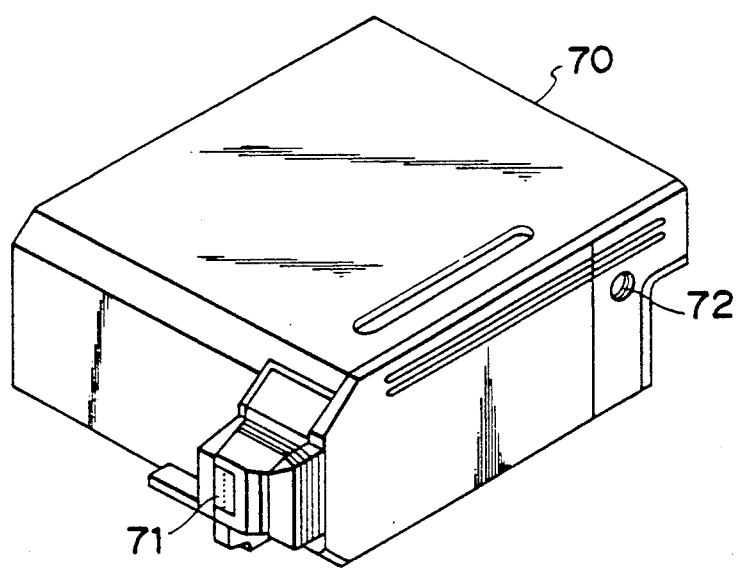
FIG. 5 is a perspective illustration of a recording unit.

The ink-jet recording apparatus used in the present invention may not be limited to the apparatus as described above in which the head and the ink cartridge are separately provided, and a device can also be preferably used in which these are integrally formed as shown in FIG. 5.

In FIG. 5, the numeral 70 denotes a recording unit, in the interior of which an ink holder that has held an ink, as exemplified by an ink absorber, is contained. The recording unit is so constructed that the ink in such an ink absorber is ejected in the form of ink droplets from a head 71 having a plurality of orifices. As a material for the ink absorber, it is preferred in the present invention to use polyurethane.

The numeral 72 denotes an air path opening through which the interior of the recording unit is communicated with the air.

This recording unit 70 can be used in place of the recording head shown in FIG. 3, and is detachably mounted to the carriage 66.

EXAMPLES

The present invention will be described below by giving Examples.

Used in the present examples is an ink-jet printer of the type a heat energy is acted on ink to eject ink droplets from orifices. The effect of the present invention can be recognized also when an ink-jet printer of a piezoelectric type is used. In the following "part(s)" refers to "part(s) by weight".

EXAMPLE 1

| | |
|---|---|
| Diethylene glycol | 7 parts |
| C.I. Food Black 2 | 3 parts |
| Ethyl alcohol | 5 parts |
| N-hydroxyethyl-p-toluenesulfonamide | 5 parts |
| Water | 80 parts |

The above components were mixed in a beaker and then stirred at 25° C. for 4 hours. The resulting mixture was pressure-filtered using a membrane filter of 0.22 μm in pore size to give an ink.

Using this ink, plain paper printing was carried out on an ink-jet printer BJ-130A, manufactured by Canon Inc., of the type in which a heat energy acts on ink to eject ink droplets. PPC paper (SK paper, DK paper) available from Canon Inc. was used as the plain paper. As a result, the fixing performance was found to be as good as 15 seconds or less with respect to all kinds of paper. The OD (measured with a Macbeth densitometer) was 1.3 or more in respect of all kinds of paper, showing that prints with high density were obtained. The print quality level was also found good since dots with substantially perfect circles were obtained without influence from the unevenness of paper. With regard to the anti-stick properties, the head was left to stand or a month in a capped state in an environment of 60° C./5% RH, and thereafter a head restoration pump was operated to confirm that the ink was normally ejected. Thus the anti-stick properties were found very good. With regard to the initial ejection performance, the ink was ejected in en environment of 15° C./10% RH and, after the head was kept uncapped for 2 minutes, the ink was again ejected. As a result, the ejection of ink was in a normal state from the first shot, and was found very good.

EXAMPLE 2

| | |
|---|---|
| Diethylene glycol | 7 parts |
| C.I. Direct Blue 199 | 3.5 parts |
| Ethyl alcohol | 5 parts |
| N-hydroxyethyl-o-toluenesulfonamide | 5 parts |

| | |
|---|---|
| Water | 79.5 parts |

Using this ink, plain paper printing was carried out. As a result, the fixing performance was found to be as good as 15 seconds or less with respect change in all kinds of paper. The OD was 1.3 or more with respect to all kinds of paper, showing that prints with high density were obtained. The print quality level was also found good since dots with substantially perfect circles were obtained without influence from the unevenness of paper. With regard to the anti-stick properties, the head was left to stand for a month in a capped state in an environment of 60° C./5% RH, and thereafter a head restoration pump was operated to confirm that the ink was normally ejected. Thus the anti-stick properties were found very good. With regard to the initial ejection performance, the ink was ejected in an environment of 15° C./10% RH and, after the head was kept uncapped for 2 minutes, the ink was again ejected. As a result, the ejection of ink was in a normal state from the first shot, and was found very good.

EXAMPLE 3

| | |
|---|---|
| Diethylene glycol | 7 parts |
| C.I. Direct Yellow 86 | 3.5 parts |
| Ethyl alcohol | 5 parts |
| N-hydroxypropyl-p-toluenesulfonamide | 5 parts |
| Water | 79.5 parts |

Using this ink, plain paper printing was carried out. As a result, the fixing performance was found to be as good as 15 seconds or less with respect to all kinds of paper. The OD was 1.3 or more with respect to all kinds of paper, showing that prints with high density were obtained. The print quality level was also found good since dots with substantially perfect circles were obtained without influence from the unevenness of paper. With regard to the anti-stick properties, the head was left to stand for a month in a capped state in an environment of 60° C./5% RH, and thereafter a head restoration pump was operated to confirm that the ink was normally ejected. Thus the anti-stick properties were found very good. With regard to the initial ejection performance, the ink was ejected in an environment of 15° C./10% RH and, after the head was kept uncapped for 2 minutes, the ink was again ejected. As a result, the ejection of ink was in a normal state from the first shot, and was found very good.

EXAMPLE 4

| | |
|---|---|
| Diethylene glycol | 7 parts |
| C.I. Direct Red 227 | 3.5 parts |
| Ethyl alcohol | 5 parts |
| N-hydroxyethyl-m-sulfamoylbenzoic acid | 5 parts |
| Water | 79.5 parts |

Using this ink, plain paper printing was carried out. As a result, the fixing performance was found to be as good as 15 seconds or less in respect of all kinds of paper. The OD was 1.3 or more in respect of all kinds of paper, showing that prints with high density were obtained. The print quality level was also found to be good since dots with substantially perfect circles were obtained without influence from the unevenness of paper. With regard to the anti-stick properties, the head was left to stand for a month in a capped state in an environment of 60° C./5% RH, and thereafter a head restoration pump was operated to confirm that the ink was normally ejected. Thus the anti-stick properties were found very good. With regard to the initial ejection performance, the ink was ejected in an environment of 15° C./10% RH and, after the head was kept uncapped for 2 minutes, the ink was again ejected. As a result, the ejection of ink was in a normal state from the first shot, and was found very good.

EXAMPLE 5

| | |
|---|---|
| C.I. Food Black 2 | 2.5 parts |
| Isopropyl alcohol | 3 parts |
| N-hydroxyethyl-p-sulfamoylphenol | 10 parts |
| Water | 84.5 parts |

Using this ink, plain paper printing was carried out. As a result, the fixing performance was found to be as good as 15 seconds or less with respect to all kinds of paper. The OD was 1.3 or more in respect to all kinds of paper, showing that prints with high density were obtained. The print quality level was also found good since dots with substantially perfect circles were obtained without influence from the unevenness of paper. With regard to the anti-stick properties, the head was left to stand for a month in a capped state in an environment of 60° C./5% RH, and thereafter a head restoration pump was operated to confirm that the ink was normally ejected. Thus the anti-stick properties were found very good. With regard to the initial ejection performance, the ink was ejected in an environment of 15° C./10% RH and, after the head was kept uncapped for 2 minutes, the ink was again ejected. As a result, the ejection of ink was in a normal state from the first shot, and was found very good.

COMPARATIVE EXAMPLE 1

| | |
|---|---|
| Diethylene glycol | 7 parts |
| C.I. Food Black 2 | 3 parts |
| Ethyl alcohol | 5 parts |
| N,N-di-(1,2-hydroxypropyl)-p-toluenesulfonamide | 5 parts |
| Water | 80 parts |

Using this ink, plain paper printing was carried out. As a result, the fixing performance, OD, print quality level and anti-stick properties were inferior to those in Example 1. In addition, with regard to the initial ejection performance, when the ink was ejected in an environment of 15° C./10% RH and, after the head was kept uncapped for 2 minutes, the ink was again ejected, the ejection of ink was in a poor state (no ejection or oblique ejection) from the first to tenth shots.

The ejection of ink was in the same poor state even when the head was kept uncapped for 10 seconds.

COMPARATIVE EXAMPLE 2

| | |
|---|---|
| Diethylene glycol | 7 parts |
| C.I. Food Black 2 | 3 parts |
| Ethyl alcohol | 5 parts |
| p-Toluenesulfonamide | 5 parts |
| Water | 80 parts |

Using this ink, plain paper printing was carried out. As a result the fixing performance, OD and print quality level were superior on substantially the same level as in Example 1. With regard to the anti-stick properties, however, when the head was left to stand for a month in a capped state in an environment of 60° C./5% RH and thereafter a head restoration pump was operated, clogging of nozzles occurred and therefore no ink was sucked and ejected.

COMPARATIVE EXAMPLE 3

| Diethylene glycol | 7 parts |
| C.I. Food Black 2 | 3 parts |
| Ethyl alcohol | 5 parts |
| Water | 85 parts |

Using this ink, plain paper printing was carried out. As a result, the fixing performance, OD and print quality level were superior on substantially the same level as in Example 1. With regard to the anti-stick properties, however, when the head was left to stand for a month in a capped state in an environment of 60° C./5% RH and thereafter a head restoration pump was operated, clogging of nozzles occurred and therefore no ink was sucked and ejected.

COMPARATIVE EXAMPLE 4

| Diethylene glycol | 7 parts |
| C.I Direct Blue 199 | 3.5 parts |
| Ethyl alcohol | 5 parts |
| Water | 84.5 parts |

Using this ink, plain paper printing was carried out. As a result, the fixing performance, OD and print quality level were superior on substantially the same level as in Example 1. With regard to the anti-stick properties, however, when the head was left to stand for a month in a capped state in an environment of 60° C./5% RH and thereafter a head restoration pump was operated, clogging of nozzles occurred and therefore no ink was sucked and ejected.

COMPARATIVE EXAMPLE 5

| Diethylene glycol | 7 parts |
| C.I. Direct Yellow 86 | 3.5 parts |
| Ethyl alcohol | 5 parts |
| Water | 84.5 parts |

Using this ink, plain paper printing was carried out. As a result, the fixing performance, OD and print quality level were superior on substantially the same level as in Example 1. With regard to the anti-stick properties, however, when the head was left to stand for a month in a capped state in an environment of 60° C./5% RH and thereafter a head restoration pump was operated, clogging of nozzles occurred and therefore no ink was sucked and ejected.

COMPARATIVE EXAMPLE 6

| Diethylene glycol | 7 parts |
| C.I. Direct Red 227 | 3.5 parts |
| Ethyl alcohol | 5 parts |
| Water | 84.5 parts |

Using this ink, plain paper printing was carried out. As a result, the fixing performance, OD and print quality level were superior on substantially the same level as in Example 1. With regard to the anti-stick properties, however, when the head was left to stand for a month in a capped state in an environment of 60° C./5% RH and thereafter a head restoration pump was operated, clogging of nozzles occurred and therefore no ink was sucked and ejected.

As described above, a high recording density, a high drying properties, a high quality level and a high reliability can be achieved on any kinds of plain paper when the ink of the present invention is used.

Also, an instrument with a high reliability can be provided by the use of the ink of the present invention.

We claim:

1. An ink comprising a recording agent and a liquid medium capable of dissolving or dispensing the recording agent, wherein said ink contains a compound in an amount ranging from 0.1% by weight to 30% by weight based on the total weight of the ink, said compound represented by the following Formula (I):

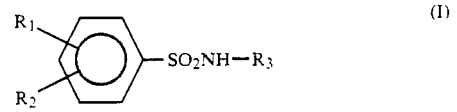

wherein $R_1$ and $R_2$ each represent a group selected from a hydrogen atom, an alkyl group, a hydroxyl group and a carboxyl group; and $R_3$ represents a monohydric hydroxyalkyl group.

2. An ink according to claim 1, wherein water is contained in an amount ranging from 40% by weight to 95% by weight based on the total weight of the ink.

* * * * *

UNITED STATES PATENT AND TRADEMARK OFFICE
CERTIFICATE OF CORRECTION

PATENT NO. : 5,080,716
DATED : January 14, 1992
INVENTOR(S) : Makoto Aoki, et al.

It is certified that error appears in the above-identified patent and that said Letters Patent is hereby corrected as shown below:

On the Title page, item

[56] REFERENCES CITED:

FOREIGN PATENT DOCUMENTS, "59-757  4/1984  Japan." should read --059757  4/1984  Japan.--.

COLUMN 1:

Line 7, "and and" should read --and an--;
Line 43, "properties" should read --properties do--;
Line 67, "dot" should read --dot,--;
Line 68, "dot," should read --dot--.

COLUMN 6:

Line 24, "ever, is" should read --ever, it is--.

COLUMN 8:

Line 46, "in respect of" should read --with respect to--;
Line 50, "uneveness" should read --unevenness--;
Line 51, "or" should read --for--;
Line 57, "en" should read --an--.

COLUMN 9:

Line 7, "change in" should read --to--;
Line 10, "Were" should read --were--;

UNITED STATES PATENT AND TRADEMARK OFFICE
CERTIFICATE OF CORRECTION

PATENT NO. : 5,080,716
DATED : January 14, 1992
INVENTOR(S) : Makoto Aoki, et al.

It is certified that error appears in the above-identified patent and that said Letters Patent is hereby corrected as shown below:

```
Line 12, "uneveness" should read --unevenness--;
Line 39, "uneveness" should read --unevenness--;
Line 62, "in respect of" should read --with respect to--;
Line 63, "in respect of" should read --with respect to--;
Line 67, "uneveness" should read --unevenness--.
```

COLUMN 10:

```
Line 22, "in" should read --with--;
Line 27, "uneveness" should read --unevenness--.
```

COLUMN 12:

```
Line 27, "properties," should read --property,--;
Line 34, "dispensing" should read --dispersing--.
```

Signed and Sealed this

Fifteenth Day of June, 1993

Attest:

MICHAEL K. KIRK

*Attesting Officer*  Acting Commissioner of Patents and Trademarks